(12) United States Patent
Otani

(10) Patent No.: US 10,173,384 B2
(45) Date of Patent: Jan. 8, 2019

(54) PNEUMATIC TIRE MANUFACTURING METHOD

(71) Applicant: SUMITOMO RUBBER INDUSTRIES, LTD., Kobe-shi, Hyogo (JP)

(72) Inventor: Masafumi Otani, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/034,265

(22) PCT Filed: Oct. 10, 2014

(86) PCT No.: PCT/JP2014/077224
§ 371 (c)(1),
(2) Date: May 4, 2016

(87) PCT Pub. No.: WO2015/083441
PCT Pub. Date: Jun. 11, 2015

(65) Prior Publication Data
US 2016/0271895 A1    Sep. 22, 2016

(30) Foreign Application Priority Data

Dec. 3, 2013 (JP) .................................. 2013-250374

(51) Int. Cl.
*B29D 30/16* (2006.01)
*B29D 30/70* (2006.01)
(Continued)

(52) U.S. Cl.
CPC ..... *B29D 30/1628* (2013.01); *B29D 30/1621* (2013.01); *B29D 30/1635* (2013.01);
(Continued)

(58) Field of Classification Search
CPC ............ B29D 30/1635; B29D 30/1628; B60C 2200/10
See application file for complete search history.

(56) References Cited

U.S. PATENT DOCUMENTS

2009/0133797 A1* 5/2009 Scarpitti ............ B29D 30/1635
152/535
2012/0152428 A1* 6/2012 Kouno ............... B29D 30/1628
152/526
(Continued)

FOREIGN PATENT DOCUMENTS

EA    2476544 A1    7/2012
EP    0501782 A2 *  9/1992 ............. B60C 9/263
(Continued)

OTHER PUBLICATIONS

Extended European Search Report for European Application No. 14868149.7, dated Jul. 25, 2017.

*Primary Examiner* — Jacob T Minskey
*Assistant Examiner* — Cedrick S Williams
(74) *Attorney, Agent, or Firm* — Birch, Stewart, Kolasch & Birch, LLP

(57) ABSTRACT

This manufacturing method of a pneumatic tire having a tread reinforcing layer reduces tire mass while maintaining the durability performance of the tire. A tread reinforcing layer formation step includes a winding step for winding belt-shape plies around an approximately cylindrical winding surface. The winding step involves: a first winding step in which, with the side edges of the belt-shape plies spaced from one another, said belt-shape plies are spirally wound from a first end located on one side of the tire in the axial direction, to a second end located on the other side of the tire in the axial direction; and a second winding step in which, with the side edges of the belt-shape plies spaced from one another, said belt-shape plies are spirally wound from the (Continued)

second end to the first end in the direction opposite that in the first winding step. A lattice-form tread reinforcing layer is formed that has gaps substantially rhombic in shape and bounded by the belt-shape plies.

12 Claims, 10 Drawing Sheets

(51) Int. Cl.
  *B60C 9/22* (2006.01)
  *B29D 30/60* (2006.01)
  *B60C 9/20* (2006.01)
(52) U.S. Cl.
  CPC .............. *B29D 30/60* (2013.01); *B29D 30/70* (2013.01); *B60C 9/2204* (2013.01); *B29D 2030/1678* (2013.01); *B60C 2009/2035* (2013.01)

(56) References Cited

U.S. PATENT DOCUMENTS

| | | | |
|---|---|---|---|
| 2012/0180925 A1* | 7/2012 | Yoshikawa | B29D 30/1635 |
| | | | 152/526 |
| 2013/0284337 A1* | 10/2013 | Croissant | B60C 9/18 |
| | | | 152/527 |

FOREIGN PATENT DOCUMENTS

| | | |
|---|---|---|
| EP | 1215035 A2 | 6/2002 |
| EP | 2065224 A1 | 6/2009 |
| JP | 9-118109 A | 5/1997 |
| JP | 2000-280709 A | 10/2000 |
| JP | 2003-71946 A | 3/2003 |
| JP | 2003-300257 A | 10/2003 |
| JP | 2007-246052 A | 9/2007 |
| JP | 2012-25308 A | 2/2012 |
| JP | 2012-179850 A | 9/2012 |

\* cited by examiner

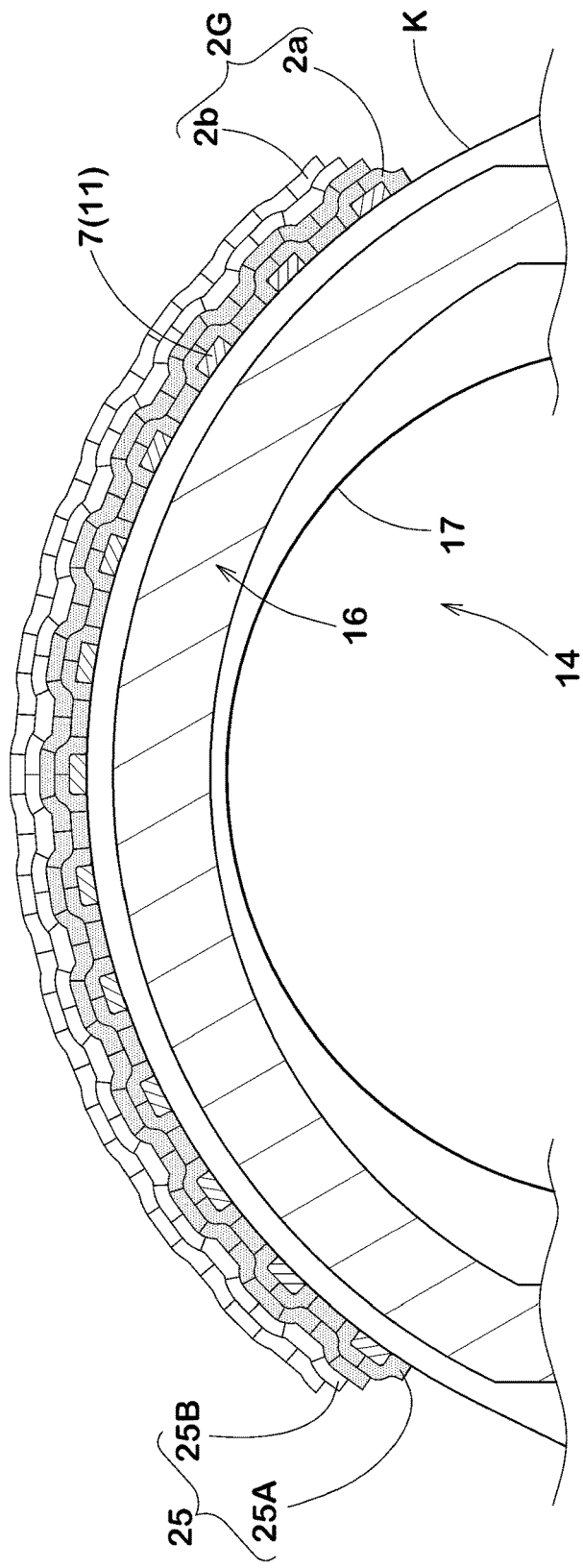

PNEUMATIC TIRE MANUFACTURING METHOD

TECHNICAL FIELD

The present invention relates to a pneumatic tire manufacturing method that allows reduction in the amount of cord usage in a tread reinforcement layer while maintaining tire durability performance.

BACKGROUND ART

Patent Literature 1 discloses a pneumatic tire including a carcass and a belt structure disposed outside the carcass in a tire radial direction. The belt structure is formed by winding a ribbon composed of a plurality of cords in a spiral manner at an angle of approximately 0 degree with respect to a tire equatorial plane.

Unfortunately, the belt structure has the cords parallel to the tire circumferential direction, and tension acting on the cords in the area of a tread portion is absorbed in that area and is not transferred to cords in the adjacent areas. Accordingly, to reinforce the tread portion by the use of the belt structure as described in Patent Literature 1, it is necessary to wind the ribbon in parallel over the entire tread portion, causing increase in cord (material) costs.

CITATION LIST

Patent Literature

Patent Literature 1: Japanese Unexamined Patent Application Publication No. H09-118109

SUMMARY OF INVENTION

Technical Problem

The present invention is devised in light of the foregoing circumstances described above. A major object of the present invention is to provide a pneumatic tire manufacturing method that basically improves the process for winding a belt-like ply and allows reduction in the amount of cord usage in the tread reinforcement layer while maintaining durability performance.

Solution to Problem

The present invention provides a method for manufacturing a pneumatic tire including a carcass extending from a tread portion through sidewall portions to bead cores in bead portions and a tread reinforcement layer disposed radially outward of the carcass in the tread portion, the method including: a tread reinforcement layer formation step of forming the tread reinforcement layer, wherein the tread reinforcement layer formation step includes a winding step of winding a long belt-like ply formed by covering one or more reinforcement cords with a topping rubber around an approximately cylindrical winding surface, the winding step includes: a first winding step of winding the belt-like ply in a spiral manner from a first end portion located on one side in a tire axial direction to a second end portion located on the other side in the tire axial direction while separating side edges of the belt-like ply from each other in turn; and a second winding step of winding the belt-like ply in a spiral manner reversely with respect to the first winding step from the second end portion to the first end portion while separating the side edges of the belt-like ply from each other in turn to form a grid-shaped tread reinforcement layer having approximately diamond-shaped spaces surrounded by the belt-like ply.

In the method for manufacturing a pneumatic tire according to the present invention, the winding step is preferably carried out with a single continuous belt-like ply.

In the method for manufacturing a pneumatic tire according to the present invention, the winding step preferably includes a parallel winding step of winding the belt-like ply in parallel along a tire circumferential direction between the first winding step and the second winding step.

In the method for manufacturing a pneumatic tire according to the present invention, in the winding step, a winding terminal end of the belt-like ply is preferably aligned with a winding start end of the belt-like ply.

In the method for manufacturing a pneumatic tire according to the present invention, when the first winding step and the second winding step are set as one cycle, the winding step is preferably performed in at least two cycles.

In the method for manufacturing a pneumatic tire according to the present invention, a width of the approximately diamond-shaped space in the tire axial direction is preferably larger than a width of the belt-like ply.

In the method for manufacturing a pneumatic tire according to the present invention, a width of the approximately diamond-shaped space in the tire axial direction is preferably in a range of from 10% to 30% of the entire width of the grid tread reinforcement layer.

In the method for manufacturing a pneumatic tire according to the present invention, the method preferably further includes a tread rubber formation step of forming a tread rubber disposed outside the tread reinforcement layer in the tire radial direction, and the tread rubber formation step includes at least a step of forming a radially innermost layer portion to adhere to the grid-shaped tread reinforcement layer of the tread rubber by winding a long belt-like rubber strip in a spiral manner.

Advantageous Effects of Invention

According to the pneumatic tire manufacturing method of the present invention, the winding step of winding a belt-like ply to form a tread reinforcement layer includes a first winding step of winding the belt-like ply in a spiral manner from a first end portion located on one side of a tire axial direction to a second end portion located on the other side of the tire axial direction while separating side edges of the belt-like ply from each other in turn, and a second winding step of winding the belt-like ply in a spiral manner reversely with respect to the first winding step from the second end portion to the first end portion while separating side edges of the belt-like ply from each other in turn. The tread reinforcement layer manufactured by the step forms a grid tread reinforcement layer having approximately diamond-shaped spaces surrounded by the belt-like ply. The grid tread reinforcement layer has no reinforcement cords in the approximately diamond-shaped spaces, and the material cost can be reduced by the non-use of cords.

The belt-like ply is formed in an approximately diamond-shaped grid. Accordingly, when tension acts on the reinforcement cords in the area with the tread reinforcement layer, the tension is also transferred to the reinforcement cords in the adjacent areas via the grid belt-like ply. Therefore, the stress applied to the cords is decreased and sufficient strength and durability performance can be maintained only by a small number of cords. Accordingly, the present invention makes it possible to manufacture a pneumatic tire that allows reduction in the amount of cord usage in the tread reinforcement layer while maintaining durability performance.

BRIEF DESCRIPTION OF DRAWINGS

FIG. 10 is a cross-sectional view illustrating conceptually a manufacturing method of a cap rubber part.

DESCRIPTION OF EMBODIMENTS

Figure 1:
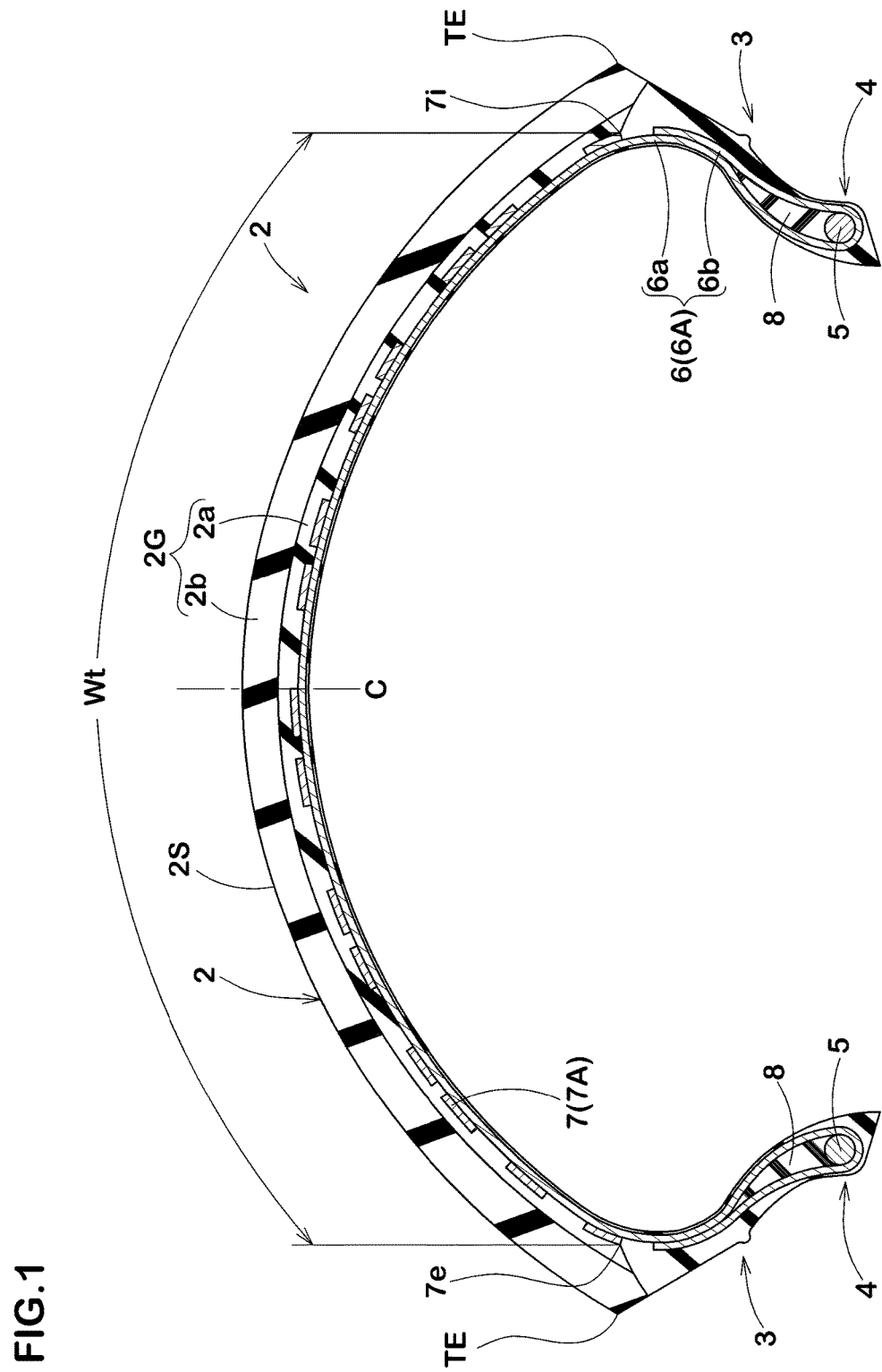
FIG. 1 is a cross-sectional view of a pneumatic tire according to one embodiment of the present invention.

An embodiment of the present invention will be described with reference to the drawings. FIG. 1 is a cross-sectional view of a pneumatic tire (hereinafter, also referred to simply as "tire") manufactured by a manufacturing method according an embodiment of the present invention in a normal state taken along a tire meridian section including a tire axis. The normal state refers to a no-loaded state in which the tire is mounted on a normal rim and inflated with a normal inner pressure. Unless otherwise noted, hereinafter, the dimensions of components of the tire are measured in the normal state.

The term "normal rim" is a rim specified for each tire by standards in a standard organization including the standards for the tire. For example, the normal rim refers to a "standard rim" under JATMA, a "design rim" under TRA, and a "measuring rim" under ETRTO. The term "normal inner pressure" refers to a pneumatic pressure specified for each tire by standards in a standard organization including the standards for the tire. The "normal inner pressure" is a "maximum pneumatic pressure" under JATMA, a maximum value described in the table "Tire Load Limits at Various Cold Inflation Pressures" under TRA, and an "inflation pressure" under ETRTO.

The tire of the embodiment is a tire for motorcycles. Tires manufactured by the manufacturing method of the present invention are not limited to tires for motorcycles but include tires for passenger cars as well as for heavy-load vehicles such as trucks, and buses, for example.

The tire of the embodiment includes a carcass 6, a tread reinforcement layer 7, and a tread rubber 2G. The carcass 6 extends from a tread portion 2 through sidewall portions 3 to bead cores 5 of bead portions 4. The tread reinforcement layer 7 is disposed outside the carcass 6 in a tire radial direction in the tread portion 2. The tread rubber 2G is disposed outside the tread reinforcement layer 7. The tread portion 2 may be provided with a groove for drainage (not illustrated) as appropriate.

The tread rubber 2G is disposed on an area between tread ends TE and TE. The tread rubber 2G of the embodiment has a base rubber 2a including a radially innermost layer portion to be overlapped with the tread reinforcement layer 7 and a cap rubber 2b disposed outside the base rubber 2a in the tire radial direction and forming a tread surface 2S. The form of the tread rubber 2G can be changed as appropriate.

The carcass 6 includes one carcass ply 6A, for example. The carcass ply 6A includes a main body part 6a extending in a troidal form between a pair of the bead cores 5 and 5 and turn-up parts 6b that connect with the both ends of the main body part 6a and are turned up around the bead cores 5 from the inside to the outside in a tire axial direction.

The carcass ply 6A is a cord ply including carcass cords coated with a topping rubber. The carcass cords are oriented at an angle of from 70 to 90 degrees with respect to the tire equator C, for example. The carcass cords are preferably made of organic fibers selected from, for example, aramid, polyethylene naphthalate (PEN), nylon, rayon, and the like.

A bead apex rubber 8 made of a hard rubber extends from the bead cores 5 outward in the tire radial direction between the main part 6a and the turn-up parts 6b of the carcass ply 6A.

The tread reinforcement layer 7 is formed of at least one reinforcement ply 7A in which reinforcement cords are arranged with an inclination with respect to the tire circumferential direction. The reinforcement cords of the reinforcement ply 7A are preferably made of steel cords or organic fiber cords, for example. The tread reinforcement layer 7 tightens the carcass 6 to enhance the rigidity of the tread portion 2 and improve durability performance.

Figure 2:
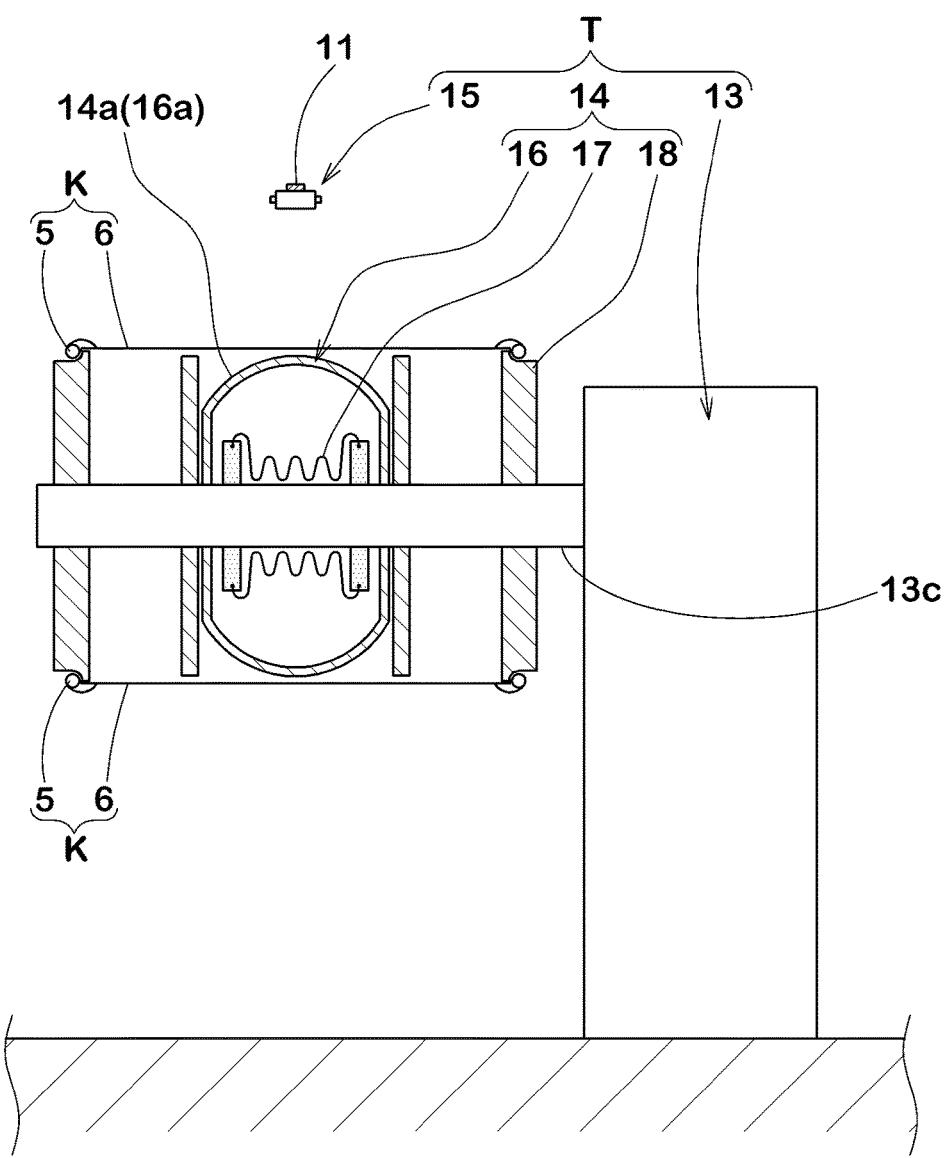
FIG. 2 is a cross-sectional view of a manufacturing apparatus used in a winding step.

Next, an embodiment of a manufacturing method for the foregoing tire will be described. FIG. 2 illustrates a manufacturing apparatus T having a known structure used for manufacture of the tread reinforcement layer 7. The manufacturing apparatus T of the embodiment includes a base stand 13, an approximately cylindrical drum 14 rotatably supported by the base stand 13, and an applicator 15 capable of supplying a belt-like ply 11 to the drum 14.

The base stand 13 includes a rotation shaft 13c rotatably holding the drum 14. The base stand 13 also includes a power transmission device for rotating the rotation shaft 13c, a control device for controlling the rotation (not illustrated), and the like.

The drum 14 includes a circular ring-shaped core body 16, a scaling device 17, and a holding device 18. The core body 16 includes an outer peripheral surface 16a approximated to a tire tread surface 2S. The scaling device 17 extends and contracts the core body 16 inward and outward in the tire radial direction. The scaling device 17 is composed of a rubber member, for example. The holding device 18 holds a raw tire base body K around which the belt-like ply 11 is to be wound. The scaling device 17 may be a reciprocating member such as an air cylinder, for example.

The raw tire base body K has a cylindrical shape and includes the bead cores 5 and the carcass 6. Rubber members (not illustrated) such as inner liner rubber and sidewall rubber are attached as appropriate to the raw tire base body K, for example.

The applicator 15 is formed in a conveyor shape, for example. The applicator 15 supplies the belt-like ply 11 on its conveyance surface to a circumferential surface 14a of the drum 14. On the upstream side of the applicator 15, a rubber extruder or the like for continuously extruding the belt-like ply 11, for example is provided (not illustrated). The applicator 15 is supported by a three-dimensional moving device (not illustrated) capable of reciprocating in an axial direction and a radial direction with respect to the drum 14, for example.

Figure 3:
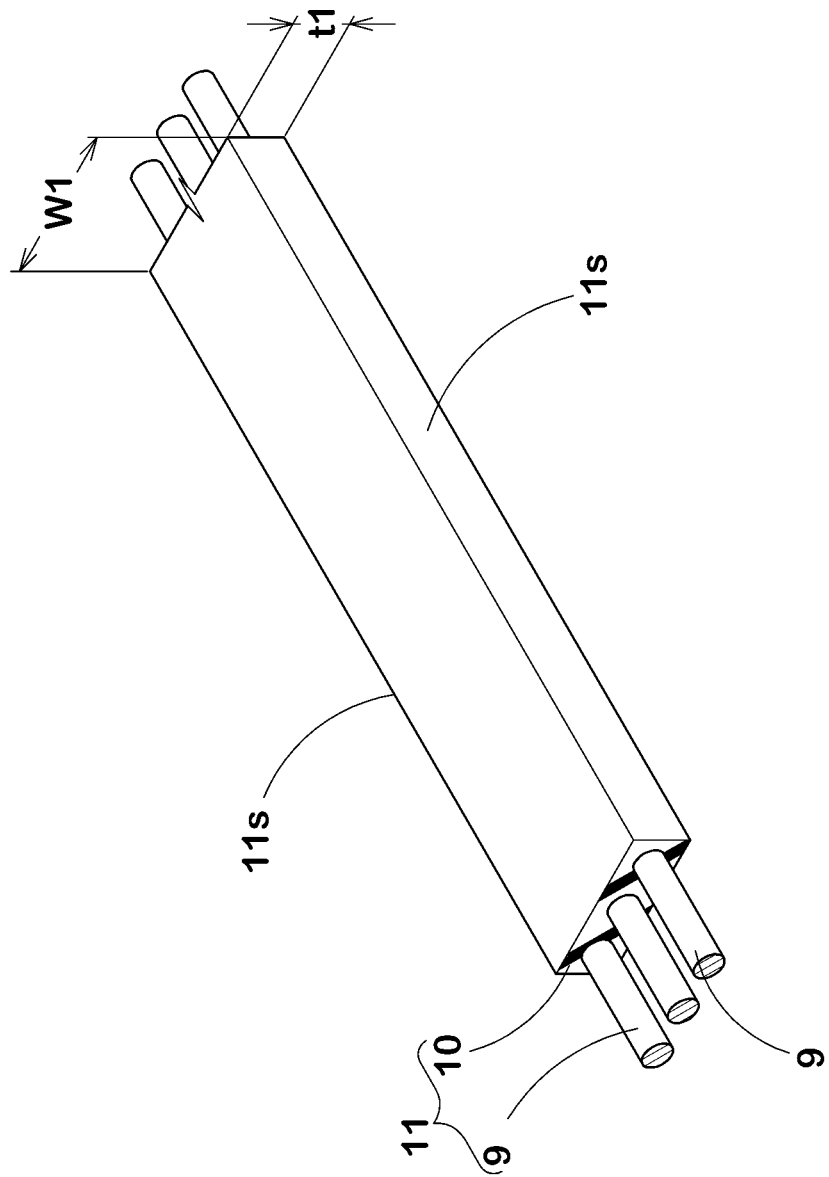
FIG. 3 is a perspective view of one embodiment of a belt-like ply.

FIG. 3 is a perspective view of the belt-like ply 11. As illustrated in FIG. 3, the belt-like ply 11 has an approximately rectangular cross section and is formed by covering with a topping rubber 10 one or more reinforcement cords 9 arranged in parallel with approximately equal intervals therebetween.

The width W1 and the thickness t1 of the belt-like ply 11 can be determined as appropriate by custom. The width W1 of the belt-like ply 11 is preferably in a range of from 3.0 to 12.0 mm, for example. The thickness t1 of the belt-like ply 11 is preferably in a range of from 0.6 to 1.5 mm. The number of the reinforcement cords 9 included in the belt-like ply 11 is preferably two to five.

A tire manufacturing method of the embodiment includes a step of preparing the raw tire base body K, a tread reinforcement layer formation step of forming the tread reinforcement layer 7, and a tread rubber formation step of forming the tread rubber 2G. The raw tire base body K is manufactured by a known manufacturing method.

As illustrated in FIG. 2, at the step of preparing the raw tire base body K, first, the raw tire base body K is placed on the diameter-reduced circumferential surface 14*a* of the drum 14 in the manufacturing apparatus T.

Figure 4:
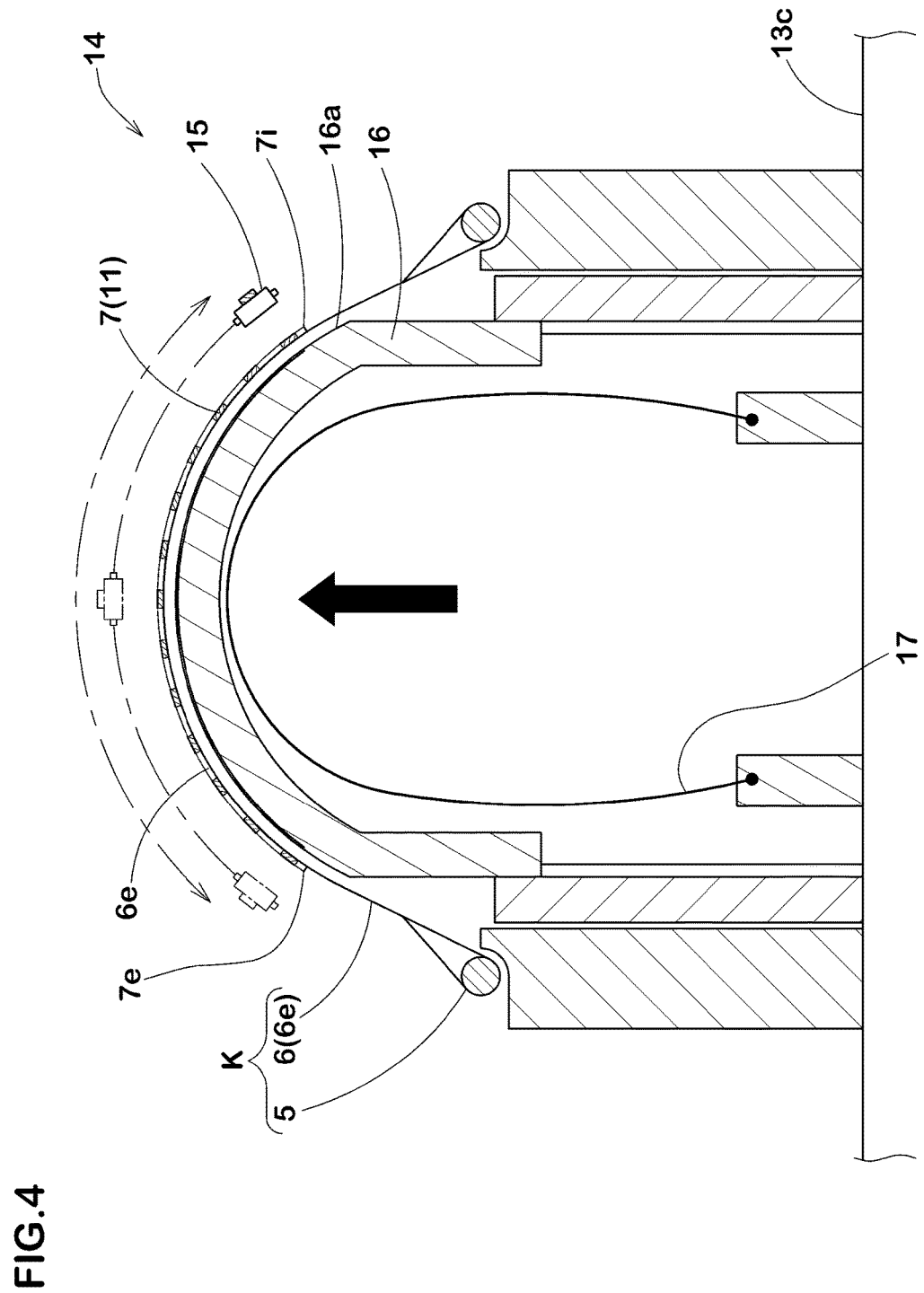
FIG. 4 is a cross-sectional view illustrating conceptually a tread reinforcement layer forming step.

Next, as illustrated in FIG. 4, the scaling device 17 is pressurized to increase the diameter of the core body 16 and bulge the raw tire base body K, for example.

Next, the tread reinforcement layer formation step is carried out. The tread reinforcement layer formation step includes a winding step of winding the belt-like ply 11 around a winding surface 6*e* of the carcass 6 of the raw tire base body K on the outside in the tire radial direction. At the winding step, the conveyance surface of the applicator 15 is preferably held in parallel to the outer peripheral surface 16*a* of the core body 16 around which the belt-like ply 11 is to be wound.

The winding step includes a first winding step, a parallel winding step, and a second winding step. When the first winding step and the second winding step are set as one cycle, the winding step is desirably performed in at least two cycles. In the embodiment, the winding step is carried out in two cycles.

Figure 5A:
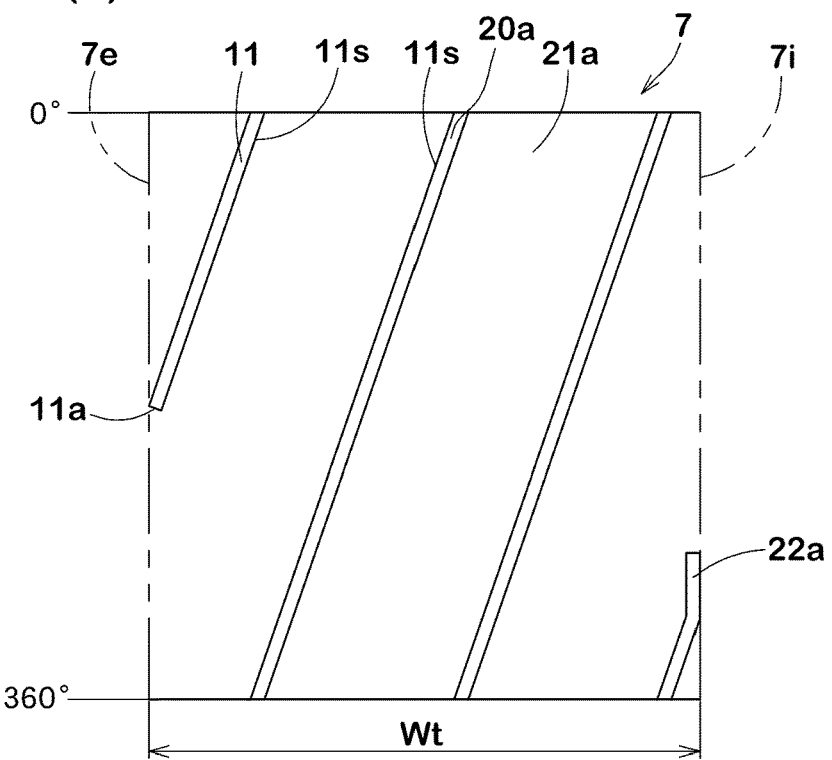
FIGS. 5A and 5B are developed plan views illustrating conceptually a tread reinforcement layer manufactured at a winding step of a first cycle.
Figure 5B:
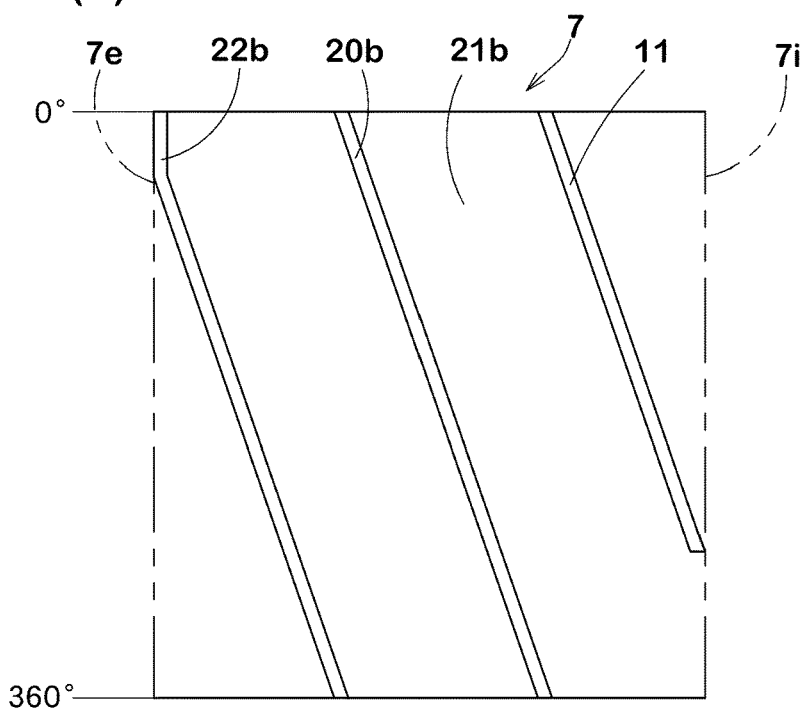
Figure 6A:
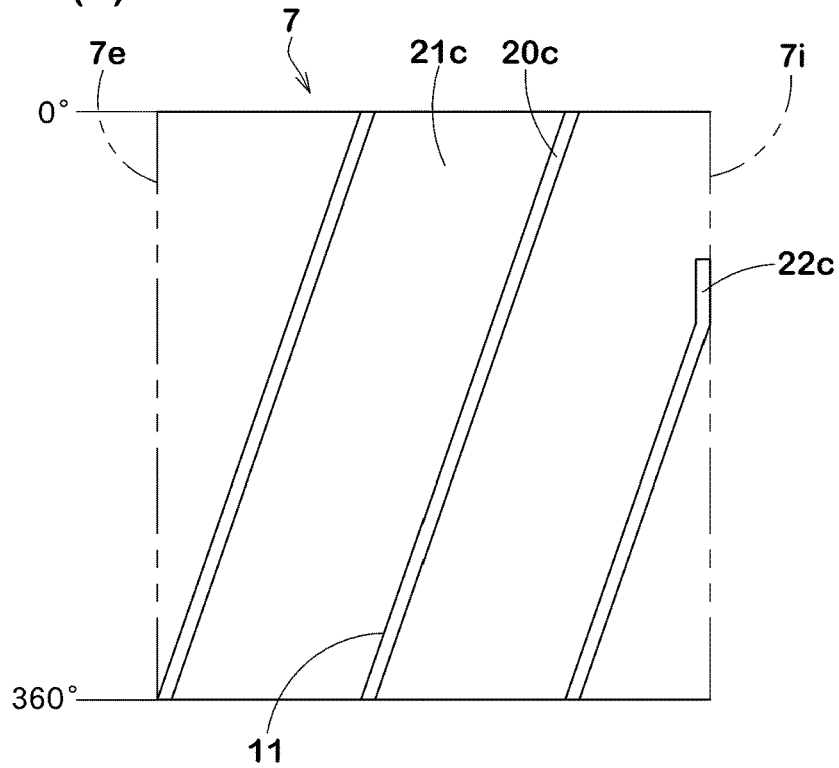
FIGS. 6A and 6B are developed plan views illustrating conceptually a tread reinforcement layer manufactured at a winding step of a second cycle.
Figure 6B:
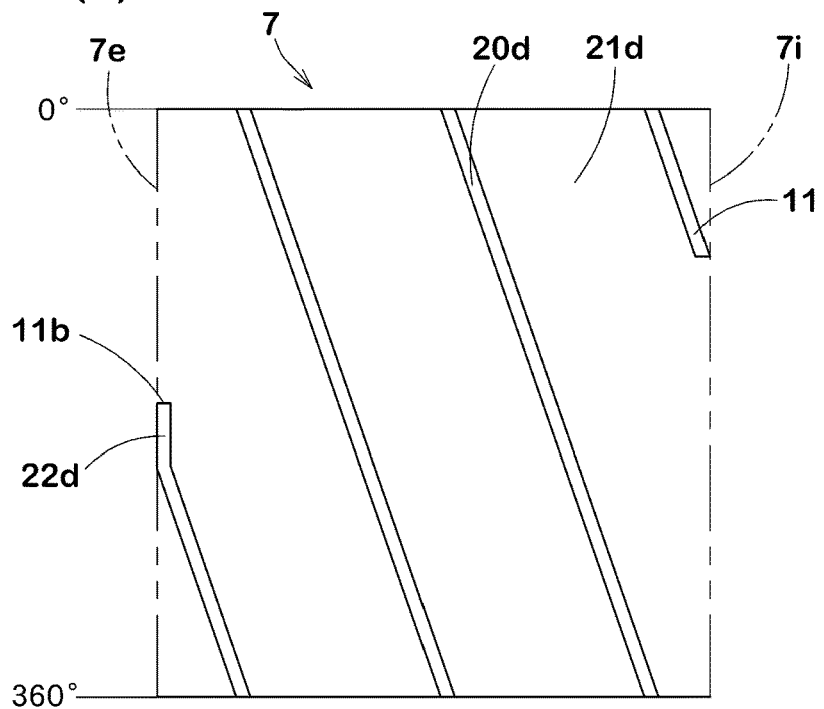

FIGS. 5A and 5B are developed plan views illustrating conceptually the tread reinforcement layer 7 manufactured at the winding step of the first cycle. FIGS. 6A and 6B are developed plan views illustrating conceptually the tread reinforcement layer 7 manufactured at the winding step of the second cycle. In FIGS. 5 and 6, the vertical axis indicates the angle of the tread reinforcement layer 7 in the tire circumferential direction, and the lateral axis indicates entire width Wt of the tread reinforcement layer 7. The entire width Wt of the tread reinforcement layer 7 refers to a developed length along the tread surface 2S (illustrated in FIG. 1).

As illustrated in FIGS. 4 and 5A, at the first winding step of the first cycle, a winding start end 11*a* of the belt-like ply 11 guided by the applicator 15 is fastened at a first end portion 7*e* of the tread reinforcement layer 7 on one side in the tire axial direction. A pressure roller (not illustrated) is desirably used to fasten the belt-like ply 11 in a reliable manner, for example.

Next, the drum 14 is rotated and the applicator 15 is moved from the first end portion 7*e* to a second end portion 7*i* of the tread reinforcement layer 7 on the other side in the tire axial direction. At that time, the belt-like ply 11 is wound in a spiral manner such that side edges 11*s* of the belt-like ply 11 are continuously separated from each other in turn. Accordingly, at the first winding step of the first cycle, a first one-side inclined portion 20*a* and a first non-winding portion 21*a* are formed. At the first one-side inclined portion 20*a*, the belt-like ply 11 is inclined to one side with respect to the tire circumferential direction. The first non-winding portion 21*a* is a portion around which the belt-like ply 11 is not wound. The angle of inclination of the belt-like ply 11 is freely adjusted by controlling the moving speed of the applicator 15 in the tire axial direction or the rotation speed of the drum 14.

Next, the parallel winding step of the first cycle is carried out. At the parallel winding step, the drum 14 is rotated while the applicator 15 is fixed at the second end portion 7*i*. Accordingly, at the parallel winding step of the first cycle, a first parallel portion 22*a* where the belt-like ply 11 extends along the tire circumferential direction is provided at the second end portion 7*i*.

Next, the second winding step of the first cycle is carried out. At this step, the belt-like ply 11 is wound in connection with the first parallel portion 22*a*. At the second winding step, the applicator 15 is moved from the second end portion 7*i* to the first end portion 7*e*. At that time, the belt-like ply 11 is wound in a spiral manner such that the side edges 11*s* are continuously separated from each other in turn. Accordingly, at the second winding step of the first cycle, as illustrated in FIG. 5(*b*), a first other-side inclined portion 20*b* and a second non-winding portion 21*b* are formed. At the first other-side inclined portion 20*b*, the belt-like ply 11 is inclined to the other side with respect to the tire circumferential direction. The second non-winding portion 21*b* is a portion around which the belt-like ply 11 is not wound.

Next, the parallel winding step is carried out between the first cycle and the second cycle. At the parallel winding step, the drum 14 is rotated while the applicator 15 is fixed at the first end portion 7*e*. Accordingly, a second parallel portion 22*b* where the belt-like ply 11 extends along the tire circumferential direction is provided at the first end portion 7*e*.

Next, the first winding step of the second cycle is carried out. At this step, the belt-like ply 11 is wound in connection with the second parallel part 22*b*. At the first winding step of the second cycle, as at the first winding step of the first cycle, the applicator 15 is moved from the first end portion 7*e* to the second end portion 7*i*. As illustrated in FIG. 6A, at the first winding step of the second cycle, a second one-side inclined portion 20*c* and a third non-winding portion 21*c* are formed. At the second one-side inclined portion 20*c*, the belt-like ply 11 is inclined to one side with respect to the tire circumferential direction. The third non-winding portion 21*c* is a portion where the belt-like ply 11 is not wound. The second one-side inclined portion 20*c* of the embodiment is provided at the first non-winding portion 21*a*.

Next, the parallel winding step of the second cycle is carried out. Accordingly, a third parallel portion 22*c* where the belt-like ply 11 extends in the tire circumferential direction is provided at the second end portion 7*i*. In the embodiment, the first parallel portion 22*a* in the first cycle and the third parallel portion 22*c* in the second cycle are shifted in position from each other in the tire circumferential direction.

Next, the second winding step of the second cycle is carried out. At this step, the belt-like ply 11 is wound in connection with the third parallel portion 22*c*. At the second winding step of the second cycle, the applicator 15 is moved from the second end portion 7*i* to the first end portion 7*e*. As illustrated in FIG. 6B, at the second winding step, a second other-side inclined portion 20d and a fourth non-winding portion 21d are formed. At the second other-side inclined portion 20d, the belt-like ply 11 is inclined to the other side with respect to the tire circumferential direction. The fourth non-winding portion 21d is a portion where the belt-like ply 11 is not wound. The second other-side inclined portion 20d of the embodiment is provided at the second non-winding portion 21b.

Next, the step for forming a fourth parallel portion 22d where the belt-like ply 11 extends in the circumferential direction with the applicator 15 fixed at the first end portion 7e is carried out.

Next, a winding terminal end 11b of the belt-like ply 11 guided by the applicator 15 is fastened at the first end portion 7e in alignment with the winding start end 11a (illustrated in FIG. 5A). In the embodiment, the winding terminal end 11b is formed at the fourth parallel portion 22d.

In this manner, the winding process is performed on the one long continuous belt-like ply 11. That is, the tread reinforcement layer 7 is formed from the one belt-like ply 11. The tread reinforcement layer 7 has high rigidity and produces the enhanced effect of reinforcing the carcass 6.

Figure 7:
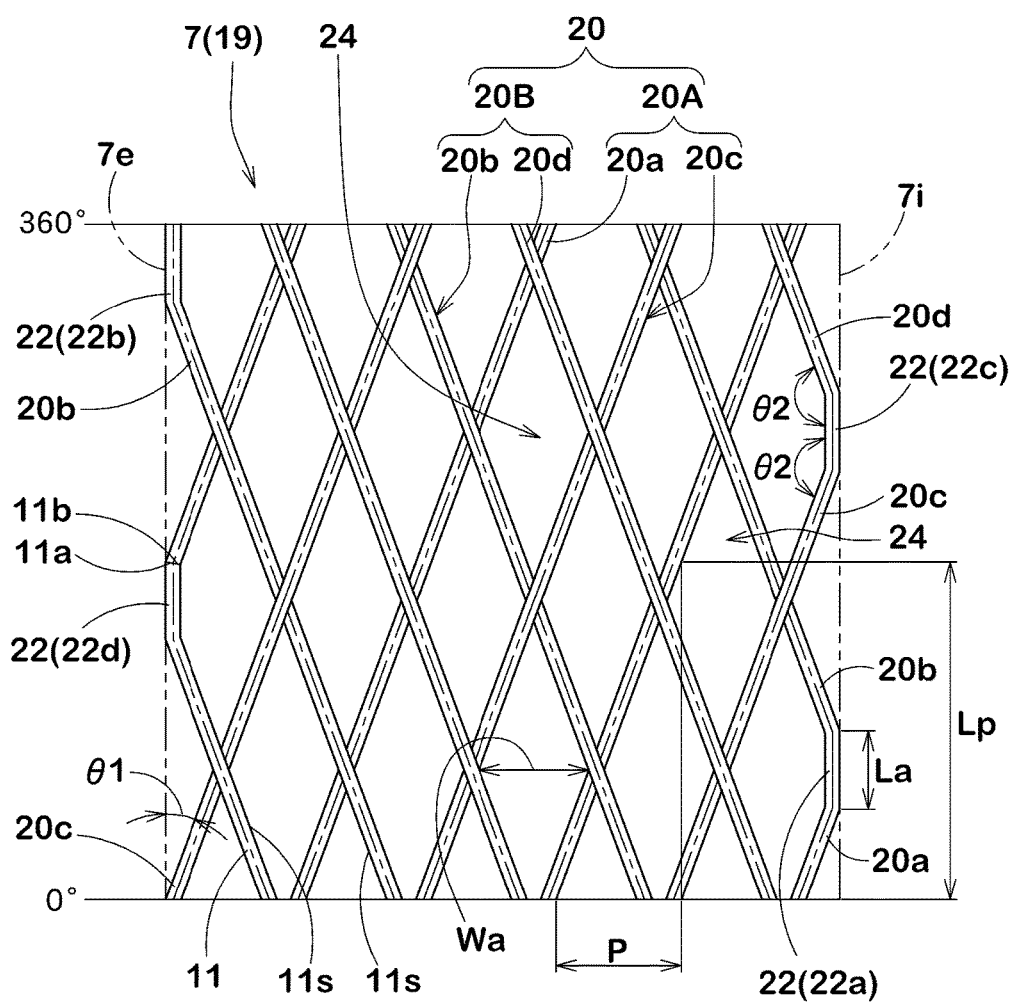
FIG. 7 is a developed plan view illustrating conceptually the tread reinforcement layer of the embodiment.

FIG. 7 is a developed plan view illustrating conceptually the tread reinforcement layer 7 manufactured in the winding process described above. As illustrated in FIG. 7, the tread reinforcement layer 7 of the embodiment is formed as a grid tread reinforcement layer 19 having almost diamond-shaped spaces 24 surrounded by the belt-like ply 11. The grid tread reinforcement layer 7 does not have the reinforcement cords 9 (illustrated in FIG. 3) in the almost diamond-shaped spaces 24, which decreases the amount of cord usage and leads to reduction in material costs. The belt-like ply 11 is formed in an almost diamond-shaped grid. Accordingly, when tension acts on the reinforcement cords 9 in the area with the tread reinforcement layer 7, the tension is also transferred to the reinforcement cords 9 in the adjacent areas via the grid belt-like ply 11. Therefore, stress applied to the cords is decreased and sufficient strength and durability performance can be maintained even with a small number of cords. The spaces 24 of the embodiment are surrounded by the one-side inclined portions 20a and 20c and the other-side inclined portions 20b and 20d (hereinafter, also referred to simply as "one-side inclined portion 20A" and "other-side inclined portion 20B").

Since the winding terminal end 11b is fastened in alignment with the winding start end 11a, the rigidity of the tread reinforcement layer 7 is ensured to further improve the durability performance of the tire. The state in which "the winding start end 11a and the winding terminal end 11b are aligned with each other" indicates the state in which the winding start end 11a and the winding terminal end 11b are in contact with each other. In addition, the state in which "the winding start end 11a and the winding terminal end 11b are aligned with each other" includes the state in which the winding start end 11a and the winding terminal end 11b overlap in the tire circumferential direction and the length of the overlapping portion in the tire circumferential direction (not illustrated) is 10 mm or less.

The width (maximum width) Wa of the almost diamond-shaped space 24 in the tire axial direction is desirably larger than the width W1 of the belt-like ply 11. This effectively reduces the amount of cord usage. From the viewpoint of maintaining the rigidity of the tread reinforcement layer 7, the width Wa of the space 24 in the tire axial direction is more preferably 3 to 10 times larger than the width W1 of the belt-like ply. The width Wa of the space 24 is a developed length along the tread surface 2S.

The width Wa of the space 24 in the tire axial direction is preferably in a range of from 10% to 30% of the entire width Wt of the grid tread reinforcement layer 19. This makes it possible to reduce the amount of cord usage and maintain the durability performance of the tire in a balanced manner.

An angle θ1 of the inclined portions 20a to 20d (hereinafter, also referred to simply as "inclined portion 20") of the belt-like ply 11 with respect to the tire circumferential direction is preferably two to ten degrees. When the angle θ1 of the belt-like ply 11 is less than two degrees, the spaces 24 become smaller in size and there is the possibility that the amount of usage of the reinforcement cords 9 cannot be reduced. When the angle θ1 of the belt-like ply 11 is more than ten degrees, there is the possibility that the effect of reinforcing the carcass 6 becomes lower.

A pitch P of the belt-like ply 11 between the one-side inclined portion 20A and the other-side inclined portion 20B adjacent to each other in the tire axial direction in turn is preferably constant. Accordingly, it is possible to effectively reduce stress applied to the reinforcement cords 9 by transferring tension acting on the reinforcement cords 9 in the area with the tread reinforcement layer 7 to the reinforcement cords 9 in the adjacent areas in a balanced manner.

To reduce the amount of usage of the reinforcement cords 9 and maintain the sufficient strength of the tread reinforcement layer 7 in a balanced manner, a length Lp of the one pitch P of the belt-like ply 11 in the tire circumferential direction is preferably 150 to 300 mm.

The one-side inclined portion 20A is connected to any one of ends of the parallel portions 22a to 22d (hereinafter, also referred to simply as "parallel portion 22") in the tire circumferential direction, and the other-side inclined portion 20B is connected to the other end of the parallel portion 22. Accordingly, an angle θ2 (smaller than 180 degrees) between the inclined portion 20 and the parallel portion 22 becomes larger than an angle (smaller than 180 degrees) formed by connecting directly the one-side inclined portion 20A and the other-side inclined portion 20B. This reduces bending stress acting on the reinforcement cords 9 to keep high joint strength between the reinforcement cords 9 and the carcass 6, thereby prevent the collapse of the wound belt-like ply 11.

The length La of the parallel portion 22 with respect to the tire circumferential direction is preferably 10 mm or more. Accordingly, the foregoing actions can be effectively exerted to reduce bending stress on the reinforcement cords 9. When the length La of the parallel portion 22 is larger than 100 mm, the amount of cord usage increases and there is the possibility that the effect of reducing the material costs becomes lower. Accordingly, the length La of the parallel portion 22 is more preferably in a range of from 13 to 50 mm. In this embodiment, the parallel portion 22 extends in less than 360 degrees around the tire axis as illustrated in FIG. 7.

Figure 8:
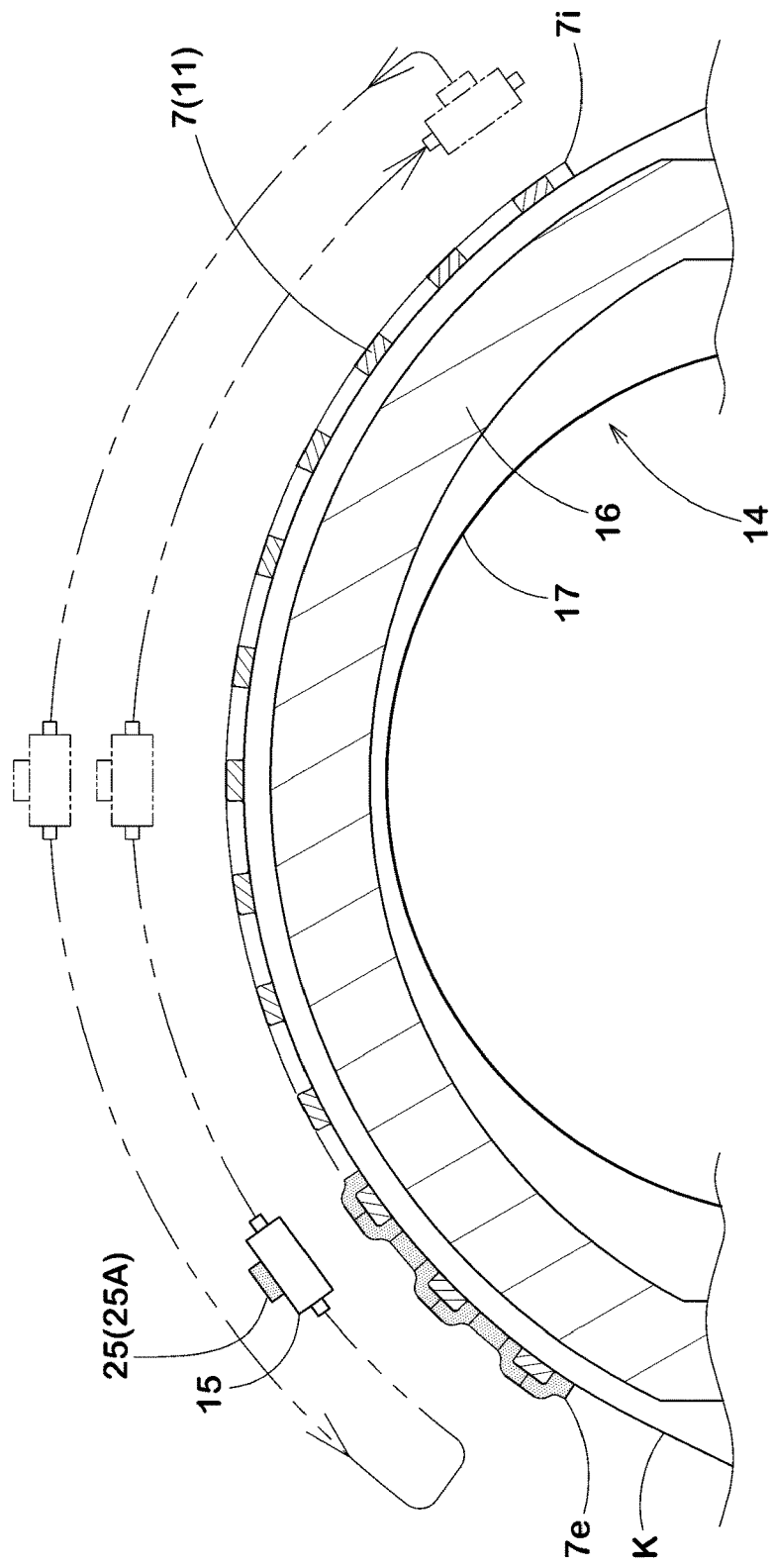
FIG. 8 is a cross-sectional view illustrating conceptually a manufacturing method of a base rubber part.
Figure 9:
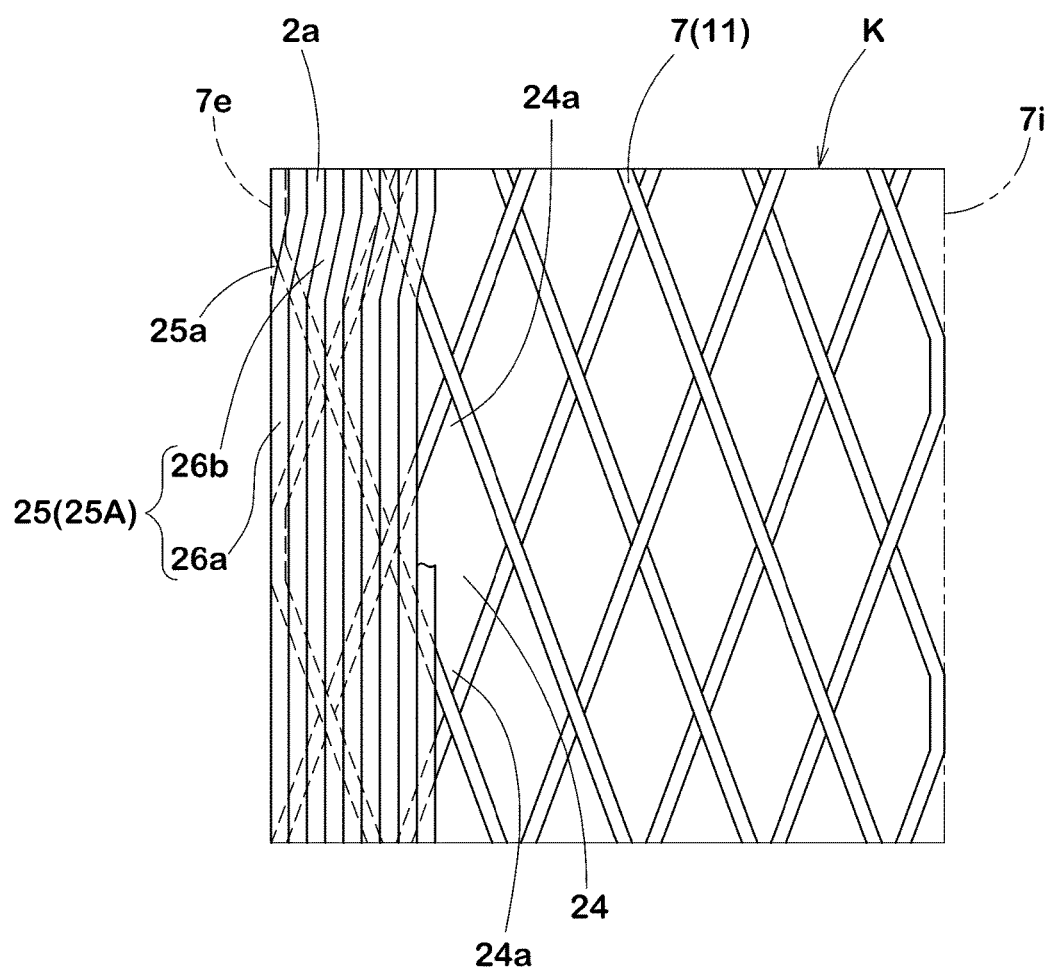
FIG. 9 is a developed plan view illustrating conceptually winding of a rubber strip for forming the base rubber part.

Next, the tread rubber formation step is carried out. As illustrated in FIGS. 8 to 10, at the tread rubber formation step of the embodiment, a strip winding method is employed to wind a long belt-like rubber strip 25 in a spiral manner. The drum 14 is used at the tread rubber formation step of the embodiment.

The rubber strip 25 is unvulcanized and is rectangular in cross section with its width larger than its thickness (not illustrated), for example. The thickness of the rubber strip 25 of the embodiment is decided as customary. The thickness of the rubber strip 25 is preferably about 0.5 to 2.0 mm.

The tread rubber formation step of the embodiment includes a base rubber formation step of forming base rubber 2a and a cap rubber formation step of forming cap rubber 2b. In this manner, the rubber strip 25 of the embodiment includes a first rubber strip 25A for forming the base rubber 2a and a second rubber strip 25B for forming cap rubber 2b.

As illustrated in FIGS. 8 and 9, a winding start end 25a of the first rubber strip 25A continuously supplied from the applicator 15 is fastened on the outer peripheral surface of the raw tire base body K around which the belt-like ply 11 is wound. After that, the applicator 15 is moved as appropriate while the drum 14 is rotated to wind the first rubber strip 25A up to its winding terminal end (not illustrated). In the embodiment, the winding start end 25a is disposed at the first end portion 7e of the tread reinforcement layer 7. The applicator supplying the rubber strip 25 may be different from the applicator 15 supplying the belt-like ply 11.

As described above, in the embodiment, the narrow first rubber strip 25A is wound on the outer side of the raw tire base body K having the grid tread reinforcement layer 19. Accordingly, the first rubber strip 25A can be easily embedded into the spaces 24 in the grid tread reinforcement layer 19. Therefore, the air between the spaces 24 and the tread rubber 2G is effectively discharged. Although there is no particular limitation, the width of the first rubber strip 25A is preferably in a range of from 50% to 100% of the width Wa of the space 24 in the tire axial direction.

The temperature at which the first rubber strip 25A is attached to the raw tire base body K is preferably of from 70 to 80 degrees. The first rubber strip 25A is in a low-viscosity state and is deformable in accordance with the shape of the belt-like ply 11 forming the spaces 24 in the grid tread reinforcement layer 19 as illustrated in FIG. 8. This makes it easy to discharge the air from the narrow portions 24a and 24a of the spaces 24 on the both sides in the tire circumferential direction.

The first rubber strip 25A is desirably directly moved by a conveyor or the like to the drum 14 without winding high-temperature rubber discharged from a gear pump not illustrated around a roll body or the like, for example.

The first rubber strip 25A of the embodiment includes a circumferential portion 26a and an inclined portion 26b. The circumferential portion 26a extends in parallel to the tire circumferential direction. The inclined portion 26b connects to the circumferential portion 26a and inclines with respect to the tire circumferential direction to move the first rubber strip 25A in the tire axial direction. The first rubber strip 25A is not limited to this mode but may be substantially formed only from the inclined portion to move the rubber strip 25A in the tire axial direction.

Next, as illustrated in FIG. 10, the cap rubber formation step is carried out to form the cap rubber 2b using the second rubber strip 25B. For the second rubber strip 25B, it is desired that a pre-formed rubber strip is rewound from a roll body and is wound by the applicator on the outer side of the base rubber 2a via a festoon (not illustrated) holding the rubber strip loosened in a U shape. The second rubber strip 25B may be formed by moving directly rubber discharged from the gear pump similar to the first rubber strip 25A. The rubber strip 25 of the embodiment is wound with side edges in contact with each other. However, the rubber strip 25 is not limited to this mode but the rubber strip 25 adjacent in the tire axial direction may be overlapped in the tire radial direction, for example.

The pneumatic tire manufacturing method of the present invention has been explained so far. The present invention is not limited to the foregoing embodiment but can be modified in various manners.

EXAMPLES

Pneumatic tires for motorcycles with a size of 190/50ZR17 having the basic structure illustrated in FIG. 1 were prototyped in accordance with the specifications in Table 1. The sample tires were tested for durability performance and evaluated for the amount of usage of reinforcement cords. Common specifications and test method for the sample tires are as follows:

The entire width Wt of the tread reinforcement layer: 200 mm

The length of the tread reinforcement layer on the tire equation in the tire circumferential direction: 610 mm The length of the tread reinforcement layer at the first and second end portions in the tire circumferential direction: 500 mm The width W1 of the belt-like ply: 4.2 mm The thickness t1 of the belt-like ply: 1.0 mm The number of reinforcement cords in the belt-like ply: three Durability performance:

The sample tires were measured in the number of remaining airs between the tread reinforcement layer and the tread rubber by shearography as an optical non-destructive inspection technique using a plurality of semiconductor lasers and a CCD camera. An X-ray CT scan device was used to take cross-sectional images of the tires to check for the presence or absence of collapse of the wound belt-like ply at the first and second end portions. When the number of remaining airs per pitch of the belt-like ply is larger than 10, the durability performance of the tire is influenced. When the collapse of the wound belt-like ply has occurred at more than three places, the durability performance of the tire is influenced. Table 1 shows the test results.

The term "extrusion" appearing in Table 1 means a manufacturing method for attaching cap rubber composed of a rubber sheet with a width equal to the length between the tread ends.

The term "STW-1" means a manufacturing method for attaching rubber strip from a roll body through a festoon.

The term "STW-2" means a manufacturing method for attaching rubber strip directly from a gear pump.

The term "film attachment" means a manufacturing method for attaching base rubber composed of a thin rubber sheet to cap rubber.

The number of remaining airs per pitch in the belt-like ply of example 3 was two.

TABLE 1

|  | Ref. 1 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Shape of spaces in tread reinforcement layer | None | Grid | Grid | Grid | Grid | Grid | Grid | Grid | Grid |
| Number of drum rotations for application of belt-like ply (times) | 50 | 32 | 32 | 32 | 32 | 32 | 32 | 32 | 24 |

TABLE 1-continued

|  | Ref. 1 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Manufacturing method of cap rubber | Extrusion Film attachment | Extrusion Film attachment | Extrusion STW-1 | Extrusion STW-2 | STW-1 STW-2 | STW-1 STW-2 | STW-1 STW-2 | STW-1 STW-2 | STW-1 STW-2 |
| Manufacturing method of base rubber |  |  |  |  |  |  |  |  |  |
| Tire circumferential length of belt-like ply per pitch Lp: (mm) | — | 195 | 195 | 195 | 195 | 195 | 195 | 195 | 260 |
| Tire circumferential length of third portion La: (mm) | — | 15 | 15 | 15 | 0 | 5 | 10 | 15 | 15 |
| Tire circumferential angle of belt-like ply θ: (degrees) | 0.15 | 4 | 4 | 4 | 4 | 4 | 4 | 4 | 4 |
| Number of collapses of wound belt-like ply at first and second end portions: (units) | 0 | 0 | 0 | 0 | 2 | 1 | 0 | 0 | 0 |
| Number of remaining airs in belt-like ply per pitch: (units) | 0 | 8 | 2 | 0 | 0 | 0 | 0 | 0 | 0 |
| Amount of usage of reinforcement cords [index: better with smaller values] | 100 | 64 | 64 | 64 | 64 | 64 | 64 | 64 | 50 |

According to the test results, it has been confirmed that the tire of the examples have decreased the amount of usage of the reinforcement cords as compared to the tire of the comparative example and maintained durability performance.

REFERENCE SIGNS LIST

7 Tread reinforcement layer
7e First end portion
7i Second end portion
11 Belt-like ply
11s Side edge
19 Grid tread reinforcement layer
24 Space

The invention claimed is:

1. A method for manufacturing a motorcycle pneumatic tire comprising a carcass extending from a tread portion through sidewall portions to bead cores in bead portions and a tread reinforcement layer disposed radially outward of the carcass in the tread portion, the method comprising:
a tread reinforcement layer formation step of forming the tread reinforcement layer, wherein
the tread reinforcement layer formation step comprises a winding step of winding a single continuous belt-like ply formed by covering one or more reinforcement cords with a topping rubber around an approximately cylindrical winding surface,
the winding step comprises:
a first winding step of winding the belt-like ply in a spiral manner from a first end portion located on one side in a tire axial direction to a second end portion located on the other side in the tire axial direction while separating side edges of the belt-like ply from each other in turn; and
a second winding step of winding the belt-like ply in a spiral manner reversely with respect to the first winding step from the second end portion to the first end portion while separating the side edges of the belt-like ply from each other in turn to form a grid-shaped tread reinforcement layer having approximately diamond-shaped spaces surrounded by the belt-like ply, wherein the grid-shaped tread reinforcement layer, in a tire cross-sectional view, extends over the tread portion that protrudes radially outwardly in an arc shape manner such that a pair of tread edges forms a pair of axially outermost locations of the tire,
wherein the winding step comprises a parallel winding step of winding the belt-like ply in parallel along a tire circumferential direction to form parallel portions extending from one of the first end portion or the second end portion, and
wherein the parallel portions extend in less than 360 degrees around a tire axis and are arranged separately from one another in the tire circumferential direction so as to form a gap therebetween.

2. The method for manufacturing motorcycle pneumatic tire according to claim 1, wherein, in the winding step, a winding terminal end of the belt-like ply is aligned with a winding start end of the belt-like ply.

3. The method for manufacturing a motorcycle pneumatic tire according to claim 1, wherein the winding step comprises a first cycle and a second cycle that is performed after the first cycle, the first cycle is such that the first winding step and the second winding step are performed using the single continuous belt-like ply, and the second cycle is such that the first winding step and the second winding step are performed using the single continuous belt-like ply.

4. The method for manufacturing a motorcycle pneumatic tire according to claim 1, wherein widths of the approximately diamond-shaped spaces in the tire axial direction are in a range from 3 to 10 times larger than a width of the belt-like ply.

5. The method for manufacturing a motorcycle pneumatic tire according to claim 1, wherein a width of the approximately diamond-shaped space in the tire axial direction is in a range of from 10% to 30% of the entire width of the grid tread reinforcement layer.

6. The method for manufacturing a motorcycle pneumatic tire according to claim 1, wherein the method further comprises a tread rubber formation step of forming a tread rubber disposed outside the tread reinforcement layer in the tire radial direction, and the tread rubber formation step comprises at least a step of forming a radially innermost layer portion to adhere to the grid-shaped tread reinforcement layer of the tread rubber by winding a long belt-like rubber strip in a spiral manner.

7. The method for manufacturing a motorcycle pneumatic tire according to claim 3, wherein in an entire width of the tread reinforcement layer, the single continuous belt-like ply is wound at the first winding step in the second cycle such that the side edges of the single continuous belt-like ply are continuously separated from the single continuous belt-like ply which has already been wound at the first winding step in the first cycle.

8. The method for manufacturing a motorcycle pneumatic tire according to claim 3, wherein in an entire width of the tread reinforcement layer, the single continuous belt-like ply is wound at the second winding step in the second cycle such that the side edges of the single continuous belt like ply are continuously separated from the single continuous belt-like ply which has already been wound at the second winding step in the first cycle.

9. The method for manufacturing a motorcycle pneumatic tire according to claim 7, wherein in an entire width of the tread reinforcement layer, the single continuous belt-like ply is wound at the second winding step in the second cycle such that the side edges of the single continuous belt like ply are continuously separated from the single continuous belt-like ply which has already been wound at the second winding step in the first cycle.

10. The method for manufacturing a motorcycle pneumatic tire according to claim 1, wherein a circumferential length of the gap is longer than circumferential lengths of the parallel portions.

11. A method for manufacturing a motorcycle a pneumatic tire comprising a carcass extending from a tread portion through sidewall portions to bead cores in bead portions and a tread reinforcement layer disposed radially outward of the carcass in the tread portion, the method comprising:
   a tread reinforcement layer formation step of forming the tread reinforcement layer, wherein
   the tread reinforcement layer formation step comprises a winding step of winding a single continuous belt-like ply formed by covering one or more reinforcement cords with a topping rubber around an approximately cylindrical winding surface,
   the winding step comprises:
   a first winding step of winding the belt-like ply in a spiral manner from a first end portion located on one side in a tire axial direction to a second end portion located on the other side in the tire axial direction while separating side edges of the belt-like ply from each other in turn; and
   a second winding step of winding the belt-like ply in a spiral manner reversely with respect to the first winding step from the second end portion to the first end portion while separating the side edges of the belt-like ply from each other in turn to form a grid-shaped tread reinforcement layer having approximately diamond-shaped spaces surrounded by the belt-like ply, wherein the grid-shaped tread reinforcement layer, in a tire cross-sectional view, extends over the tread portion that protrudes radially outwardly in an arc shape manner such that a pair of tread edges forms a pair of axially outermost locations of the tire,
   wherein the winding step comprises a parallel winding step of winding the belt-like ply in parallel along a tire circumferential direction to form a parallel portion extending from one of the first end portion or the second end portion,
   wherein the parallel portion extends in less than 360 degrees around a tire axis, and
   wherein in the winding step, an end surface of a winding terminal end of the belt-like ply is in contact with an end surface of a winding start end of the belt-like, or the winding terminal end of the belt-like ply and the winding start end of the belt-like ply overlap with each other in a length of 10 mm or less in the tire circumferential direction.

12. A method for manufacturing a motorcycle a pneumatic tire comprising a carcass extending from a tread portion through sidewall portions to bead cores in bead portions and a tread reinforcement layer disposed radially outward of the carcass in the tread portion, the method comprising:
   a tread reinforcement layer formation step of forming the tread reinforcement layer, wherein
   the tread reinforcement layer formation step comprises a winding step of winding a single continuous belt-like ply formed by covering one or more reinforcement cords with a topping rubber around an approximately cylindrical winding surface,
   the winding step comprises:
   a first winding step of winding the belt-like ply in a spiral manner from a first end portion located on one side in a tire axial direction to a second end portion located on the other side in the tire axial direction while separating side edges of the belt-like ply from each other in turn; and
   a second winding step of winding the belt-like ply in a spiral manner reversely with respect to the first winding step from the second end portion to the first end portion while separating the side edges of the belt-like ply from each other in turn to form a grid-shaped tread reinforcement layer having approximately diamond-shaped spaces surrounded by the belt-like ply, wherein the grid-shaped tread reinforcement layer, in a tire cross-sectional view, extends over the tread portion that protrudes radially outwardly in an arc shape manner such that a pair of tread edges forms a pair of axially outermost locations of the tire,
   wherein the winding step comprises a parallel winding step of winding the belt-like ply in parallel along a tire circumferential direction to form a parallel portion extending from one of the first end portion or the second end portion,
   wherein the parallel portion extends in less than 360 degrees around a tire axis, and
   wherein widths of the approximately diamond-shaped spaces in the tire axial direction are in a range from 3 to 10 times larger than a width of the belt-like ply.

* * * * *